(12) United States Patent
Brown et al.

(10) Patent No.: US 6,842,868 B1
(45) Date of Patent: *Jan. 11, 2005

(54) CONNECTION INTEGRITY MONITOR FOR DIGITAL SELECTION CIRCUITS

(75) Inventors: Matthew D. Brown, Kinburn (CA); Ross Caird, Ottawa (CA); Joleen K. Hind, Ottawa (CA); Jean Guy G. Chauvin, Navan (CA)

(73) Assignee: Nortel Networks Limited, St. Laurent (CA)

( * ) Notice: Subject to any disclaimer, the term of this patent is extended or adjusted under 35 U.S.C. 154(b) by 774 days.

This patent is subject to a terminal disclaimer.

(21) Appl. No.: 09/733,062

(22) Filed: Dec. 11, 2000

Related U.S. Application Data

(63) Continuation-in-part of application No. 09/397,968, filed on Sep. 17, 1999.

(51) Int. Cl.[7] .................................................. G06F 11/00
(52) U.S. Cl. ......................................... 714/43; 714/716
(58) Field of Search ........................... 714/43, 824, 819, 714/712, 713, 716, 821

(56) References Cited

U.S. PATENT DOCUMENTS

| | | | | |
|---|---|---|---|---|
| 4,561,094 A | * | 12/1985 | Jackowski et al. | ........... 714/735 |
| 4,845,736 A | * | 7/1989 | Posner et al. | ............. 379/27.01 |
| 5,095,418 A | * | 3/1992 | Arita et al. | .................... 700/82 |
| 5,241,550 A | * | 8/1993 | Kusano | ....................... 714/824 |
| 5,453,990 A | * | 9/1995 | Aoki et al. | .................. 714/712 |
| 6,005,695 A | | 12/1999 | Roberts | ....................... 359/110 |
| 6,505,310 B1 | * | 1/2003 | Brown et al. | .................. 714/43 |
| 6,603,112 B1 | * | 8/2003 | Medard et al. | ......... 250/227.11 |

* cited by examiner

*Primary Examiner*—Scott Baderman
*Assistant Examiner*—Joshua Lohn

(57) ABSTRACT

A connection integrity monitor is provided wherein, for large switch fabrics (connection circuits), gate usage and power requirements are reduced by a value approaching 50% when compared to a previously disclosed connection integrity monitor. Rather than simultaneously monitoring the connectivity of all outputs of the switch fabric, thus completely duplicating the switch fabric, the connection integrity monitor monitors only one connection at a time. Therefore, redundancy is reduced from M to 1. The connection integrity monitor can be provisioned statically to monitor any one of the output connections or arranged so that all connections can be monitored, although not simultaneously.

5 Claims, 5 Drawing Sheets

CONNECTION INTEGRITY MONITOR FOR DIGITAL SELECTION CIRCUITS

CROSS-REFERENCE TO RELATED APPLICATION

This is a continuation-in-part of Application Ser. No. 09/397,968 filed Sep. 17, 1999, the contents of which are incorporated herein by reference.

FIELD OF THE INVENTION

The present invention relates to digital selection circuits and, more particularly, to monitoring connection integrity in digital selection circuits.

BACKGROUND OF THE INVENTION

A data path often includes devices known as selectors and cross-connectors so that connections between a variety of inputs and a variety of outputs can be configured electronically. Such devices are known generally as digital selection circuits and may, for example, selectively connect one of 16 inputs to one of 16 outputs. Should such a device fail such that an incorrect input is connected to a given output, the fault would often be undetected. Many applications include information that can be periodically extracted to determine whether the correct payload is being carried. However, in some applications, it is not possible to extract such information from the payload. In these latter applications then, the ability to ensure that a point where a misconnection may occur is monitored to detect such a failure is desirable. As a consequence of failing to detect a connection fault, incorrect traffic may be connected on the given output to downstream equipment. Further, the traffic cannot be guaranteed, nor can the fault be isolated when detected by some means external to the transmission.

U.S. patent application Ser. No. 09/397,968 provides a method and apparatus for ensuring that connection failures occurring in a data path will be detected. This allows the fault to be isolated, protected and alarmed, thus avoiding improper traffic routing and facilitating subsequent repair. In accordance with one aspect of the application, there is provided a method of monitoring a connection unit, the connection unit comprising a primary connection map for receiving connection control signals and a primary connection circuit for receiving input from the primary connection map and for performing primary connections between a plurality of inputs and a plurality of primary outputs, the primary connections based on the connection control-signals, the method including receiving the connection control signals and the plurality of inputs. The method further includes performing secondary connections between the plurality of inputs and a plurality of secondary outputs, the secondary connections based on the connection control signals, receiving the plurality of primary outputs and determining a connection integrity status indicator from the plurality of primary outputs and the plurality of secondary outputs. In another aspect of the application a connection integrity monitor is provided for carrying out this method.

Unfortunately, the connection integrity monitor of the referenced application requires complete replication of the primary connection circuit which is very inefficient in terms of power, gate usage and cost.

SUMMARY OF THE INVENTION

A connection integrity monitor is provided having the same functionality as the previous connection integrity monitor but the gate usage and power requirement is reduced by a value approaching 50% for large switch fabrics (connection circuits). Rather than simultaneously monitoring the connectivity of all outputs of the switch fabric, thus completely duplicating the switch fabric, the connection integrity monitor monitors only one connection at a time. Therefore, the connection integrity monitor reduces the redundancy from M to 1. The connection integrity monitor can be provisioned statically to monitor any one of the output connections or polled so that all connections can be monitored, although not simultaneously.

In accordance with an aspect of the present invention there is provided a method of monitoring a connection unit, where the connection unit includes a primary connection map for receiving connection control signals and a primary connection circuit for performing primary connections between a plurality of inputs and a plurality of outputs in order to connect a plurality of input signals at the plurality of inputs to the plurality of outputs as output signals, the primary connections based on the connection control signals. The method includes receiving the connection control signals, receiving the plurality of input signals, receiving the plurality of output signals, selecting one of the plurality of input signals as a selected input signal and selecting one of the plurality of output signals as a selected output signal. At least one of the selecting one of the plurality of input signals and the selecting one of the plurality of output signals is based on the connection control signals. The method further includes determining a connection integrity status indicator from the selected input signal and the selected output signal.

In accordance with another aspect of the present invention there is provided a connection integrity monitor for monitoring a connection unit, the connection unit including a primary connection map for receiving connection control signals and a primary connection circuit for performing primary connections between a plurality of inputs and a plurality of outputs in order to connect a plurality of input signals at the plurality of inputs to the plurality of outputs as output signals, the primary connections based on the connection control signals. The monitor includes a comparison map for receiving the connection control signals and an input selection circuit for receiving the plurality of input signals and selecting one of the plurality of input signals as a selected input signal. The monitor further includes an output selection circuit for receiving the plurality of output signals and selecting one of the plurality of output signals as a selected output signal. At least one of the selecting one of the plurality of input signals and the selecting one of the plurality of output signals is based on the connection control signals. The monitor also includes a comparator for receiving the selected input signal, receiving the selected output signal and determining a connection integrity status indicator from the selected input signal and the selected output signal.

In accordance with a further aspect of the present invention there is provided a method of monitoring a connection unit, where the connection unit includes a primary connection map for receiving connection control signals and a primary connection circuit for performing primary connections between a plurality of inputs and a plurality of outputs in order to connect a plurality of input signals at the plurality of inputs to the plurality of outputs as output signals, the primary connections based on the connection control signals. The method includes receiving the connection control signals, receiving the plurality of input signals, receiving one of the plurality of output signals, selecting one of the plurality of input signals as a selected input signal, where the selecting is based on the connection control signals and determining a connection integrity status indicator from the selected input signal and the received one of the plurality of output signals.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
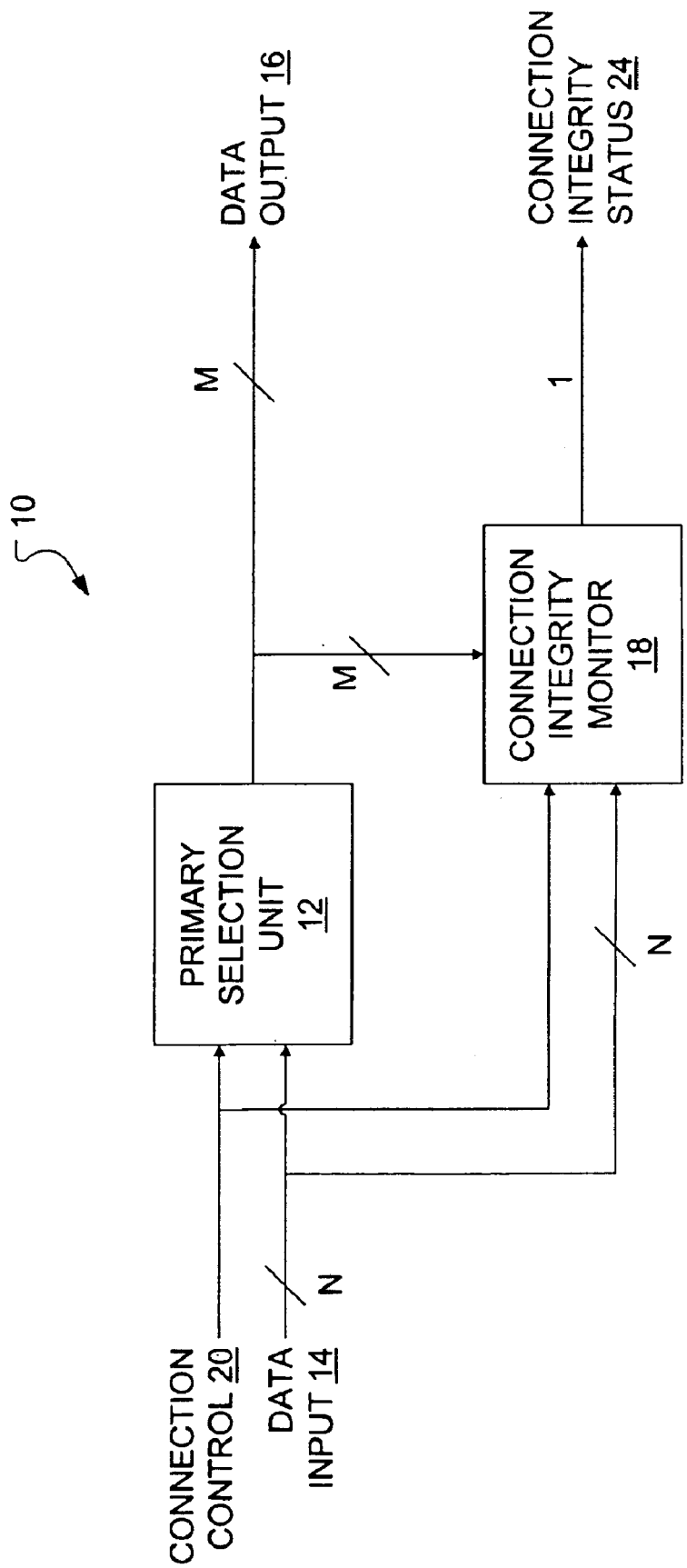
FIG. 1 is a schematic illustration of a connection integrity monitor circuit according to one embodiment of the invention.

Referring now to the drawings, FIG. 1 illustrates a switched circuit 10 wherein a primary selection unit 12 connects one of N input paths 14 to selected ones of M output paths 16 according to input on a connection control path 20. If M is equal to one then the connection circuit is equivalent to a N:1 multiplexer or selector. A connection integrity monitor (CIM) 18 also receives input connection control on the connection control path 20 along with data input on the input paths 14 and the data output on the output paths 16 from the primary selection unit 12. The output of the CIM 18 is an indication, on a connection integrity status line 24, of agreement between data on a particular one of the output paths 16 and data on a corresponding one of the input paths 14.

Figure 2:
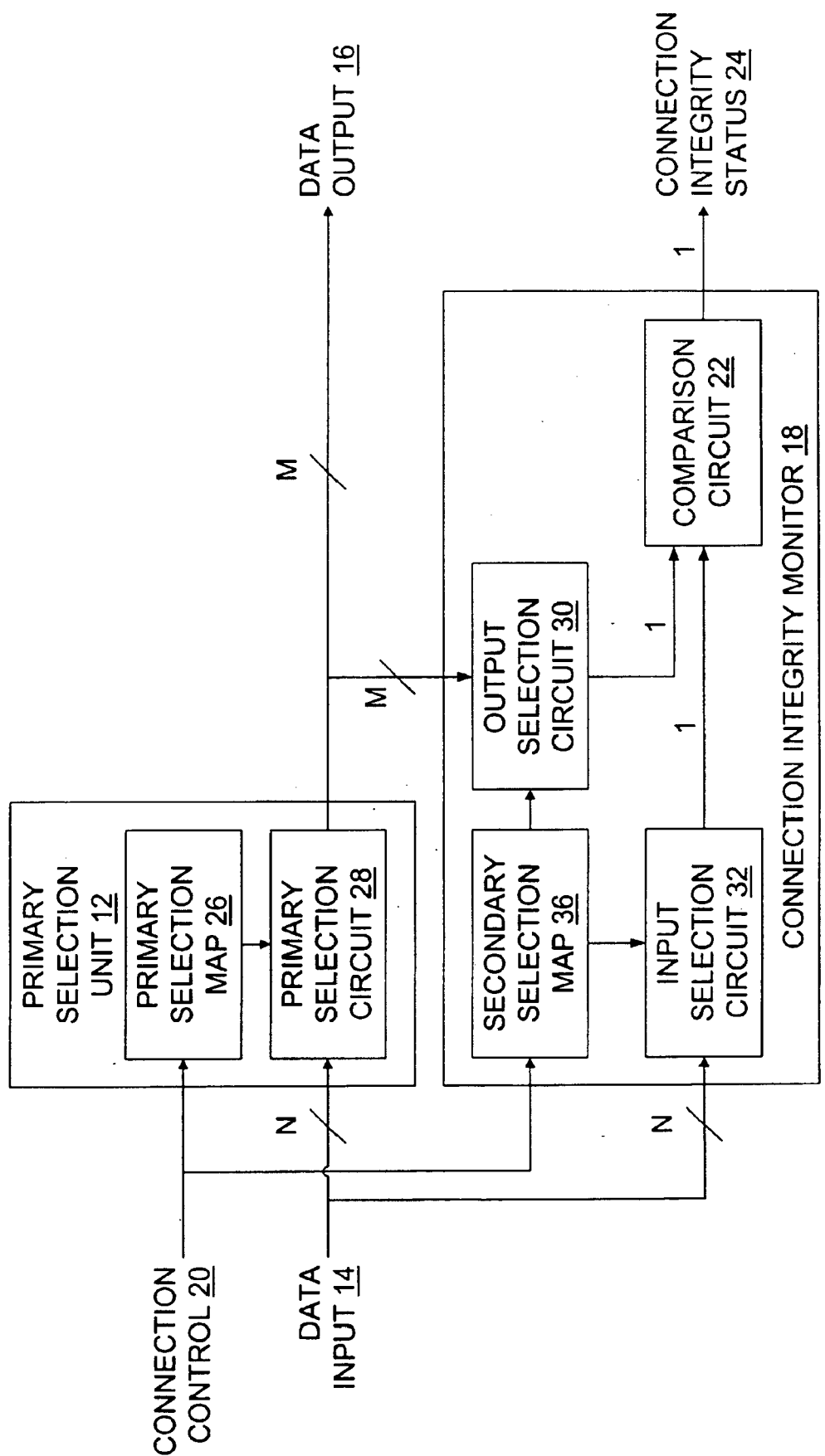
FIG. 2 is a similar view to FIG. 1 illustrating the circuit for higher level architecture.

Referring now to FIG. 2, one embodiment for the CIM and the primary selection unit are detailed. In this embodiment, the primary selection unit 12 is illustrated as comprising a primary selection map 26 that receives connection control signals on the connection control path 20 and passes output to a primary selection circuit 28 that also receives data from the N data input paths 14. Correspondingly, the CIM 18 comprises a secondary selection map 36 that receives connection control signals on the connection control path 20 and passes output to an input selection circuit 32 that also receives data from the N input paths 14. Additionally, secondary selection map 36 passes output to an output selection circuit 30 that receives data from the M output paths 16. Data on one of the input paths 14 is selected by the input selection circuit 32, according to instruction received from the secondary selection map 36, and sent to a comparison circuit 22. Similarly, data on one of the M output paths 16 is selected by the output selection circuit 30, according to instruction received from the secondary selection map 36, and sent to the comparison circuit 22. The output of the comparison circuit 22 is an indication (of connection integrity) on the connection integrity status line 24.

In operation, based on input received on the control path 20, the primary selection map 26 provides information to the primary selection circuit 28 as to which of the N input paths 14 to connect to which of the M output paths 16. In the CIM 18, the secondary selection map 36 provides information to the input selection circuit 32 and the output selection circuit 30 that allows the selection circuits 30, 32 to direct a particular one of the N input paths 14 and a corresponding one of the M output paths 16 to the comparison circuit 22. The correspondence of an output path to an input path is based on input received on the control path 20 at the secondary selection map 36.

While the secondary selection map 36 of the CIM 18 is programmed with connection control data on the connection control path 20 in a similar manner to the primary selection map 26 of the primary selection unit 12 (such that, absent faults, the maps should contain the same information), the map circuitry is independent.

The comparison circuit 22 receives an input signal on the selected one of the N input paths 14 and an output signal on the corresponding one of the M output paths 16 and generates a signal indicative of a difference between input signal and output signal. If the difference indicative signal exceeds a threshold, the comparison circuit 22 indicates a connection fault on the connection integrity status line 24.

As will be apparent to a person skilled in the art, a delay may be introduced by the primary selection unit 12 such that a direct comparison of an input signal to an output signal may be offset in time and, therefore, be inaccurate. Accordingly, the comparison circuit 22 may be provided with the capability of matching the delay of the input signal to the delay of the output signal, before generating the difference indicative signal.

The CIM 18 provides the same functionality as the circuit of U.S. patent application Ser. No. 09/397,968, but the gate usage and power requirement is reduced by a value approaching 50% for large switch fabrics. Rather than simultaneously monitoring the connectivity to all outputs of the primary selection circuit 28, thus completely duplicating the primary selection circuit 28, the CIM 18 monitors only one connection at a time. Therefore, the CIM 18 reduces the redundancy from M to 1. The CIM 18 can be provisioned statically to monitor a particular one of the M output paths 16 or arranged so that each of the M output paths 16 may be monitored, though not simultaneously. For example, each of the M output paths 16 may be monitored in a round robin basis, or randomly. Alternatively, each of the N input paths 14 may be monitored on any suitable basis.

In alternative arrangement, the input selection circuit 32 could select an arbitrary one of the N input paths 14 and indicate the selection to the secondary selection map 36 which responds by outputting an indication of the corresponding one of the M output paths 16 to the output selection circuit 30 so that the latter outputs the corresponding one of the M output paths 16 to the comparison circuit 22.

As a further alternative, the output selection circuit 30 could select an arbitrary one of the M output paths 16 and indicate the selection to the secondary selection map 36 which responds by outputting an indication of the corresponding one of the N input paths 14 to the input selection circuit 32 so that the latter outputs the corresponding one of the N input paths 14 to the comparison circuit 22.

The arbitrary selection may be accomplished in a round robin or random basis.

Figure 3:
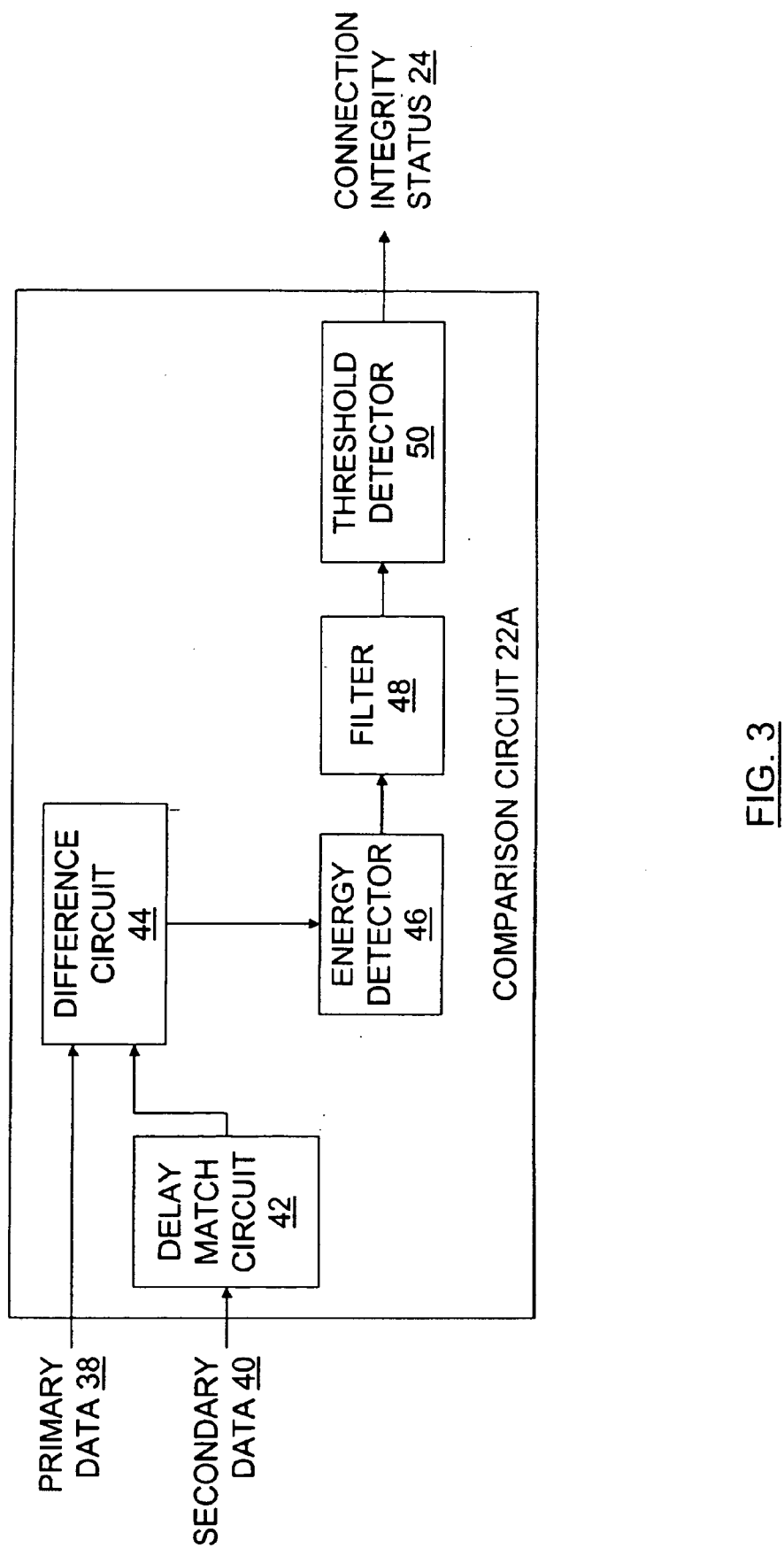
FIG. 3 is a schematic illustration of a first exemplary comparison circuit for use in the connection integrity monitor circuit of FIG. 1 according to an embodiment of the present invention.

A first exemplary comparison circuit 22A, exemplary of the comparison circuit 22 in FIG. 2, is schematically illustrated in FIG. 3. The first exemplary comparison circuit 22A compares two selected data streams to determine whether they are the same. A primary data stream 38 will be data on a selected one of the M data output paths 16 output from the output selection circuit 30 and a secondary data stream 40 will be data on a selected corresponding one of the N data input paths output from the input selection circuit 32. A delay match circuit 42 receives input from the secondary data stream 40 and passes the secondary data stream 40 delayed such that it corresponds in time to the primary data stream 38. A difference circuit 44 receives the primary data stream 38 and output from the delay match circuit 42 and passes output to an energy detector 46. A DC detected difference signal at the output of the energy detector 46 is filtered by a filter 48 to remove any AC components. The filtered difference signal is passed to a threshold detector 50 that indicates, on the connection integrity status line 24, when the difference signal exceeds an appropriate threshold. Preferably, a high on the connection integrity status line 24 indicates no fault or matched connection, while a low indicates an active fault or unmatched connection.

The operation of the first exemplary comparison circuit 22A comprises matching the delay of the secondary data stream 40 to the primary data stream 38, subtracting the two data streams from one another, filtering that difference and comparing the filtered difference to an appropriate threshold. If the energy remaining after filtering is greater than an appropriate threshold, which allows for some residual waveform discrepancy, then the connection integrity status will indicate a failed condition.

Specifically, the actions of the first exemplary comparison circuit 22A are carried out by the following components. The delay match circuit 42 provides a delay equivalent to the offset between the primary 38 and secondary 40 data streams. The purpose being to minimise the difference energy caused by misalignment of the signals. Delay matching may not be necessary if similar devices are used for both primary and secondary signal selection. The delay match circuit 42 may consist of a matched delay line, a lumped element delay, a variable delay element (tuneable to optimum delay) or one of many other possible circuits known to those skilled in the art. The difference circuit 44 effectively subtracts the two signals from one another. The energy detect circuit 46 converts the difference signal from the difference circuit 44 into a DC signal which, after filtering, is proportional to the discrepancy between the primary 38 and secondary 40 data streams. Note that the difference and energy detect circuits may be combined into a single function such as a linear mixer or exclusive-OR gate (XOR), each approximating a multiplication. The filter 48 is necessary to remove the AC component of the detected difference signal. The output of the filter 48 provides a voltage proportional to the discrepancy between the primary 38 and secondary 40 data streams. The threshold detector 50 indicates when the detected DC voltage exceeds an appropriate threshold. Hysteresis may be implemented such that small undulations on the DC voltage do not cause the detected status to oscillate.

Figure 4:
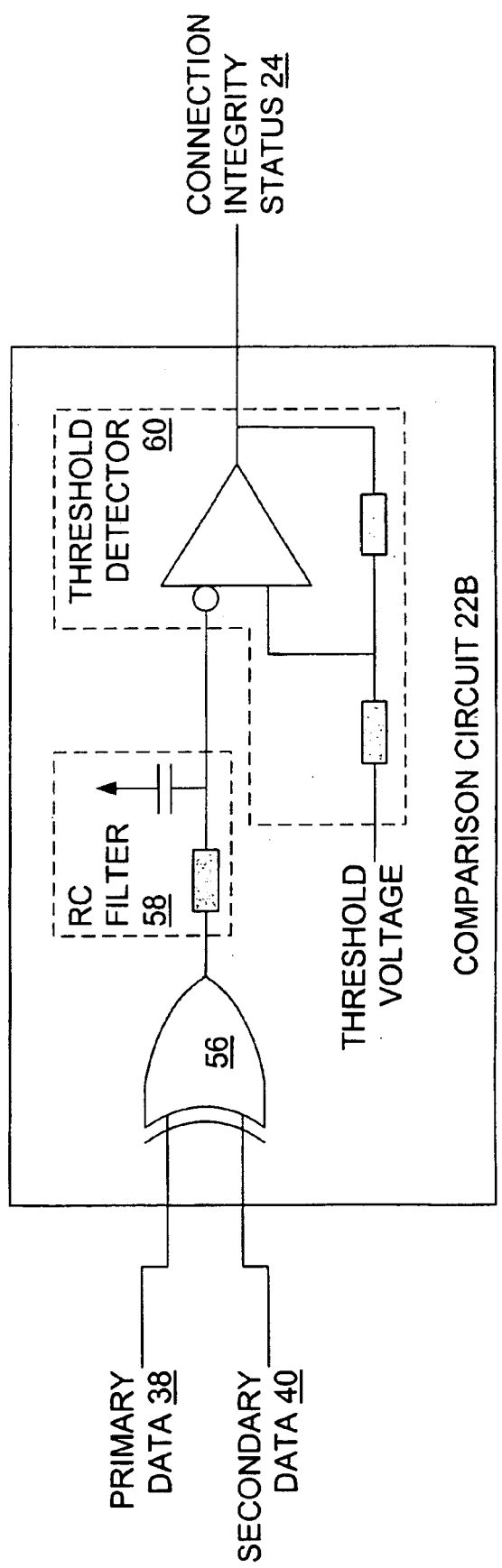
FIG. 4 is a schematic illustration of a second exemplary comparison circuit for use in the connection integrity monitor circuit of FIG. 1 according to an embodiment of the present invention.
Figure 5:
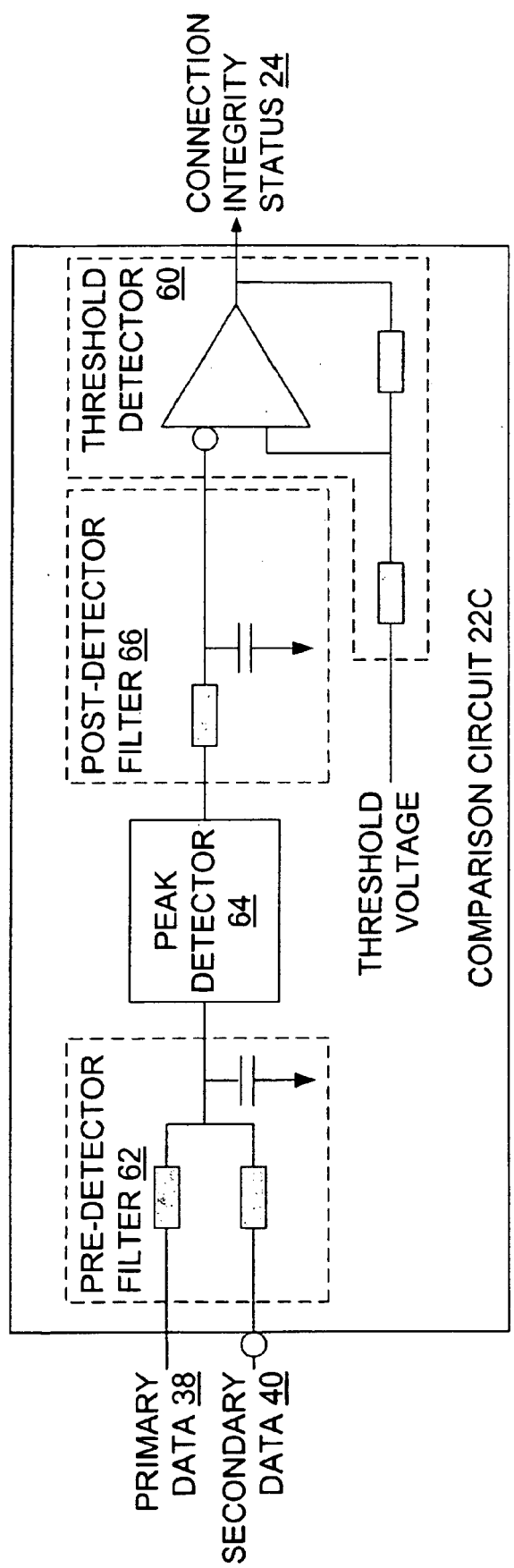
FIG. 5 is a schematic illustration of a third exemplary comparison circuit for use in the connection integrity monitor circuit of FIG. 1 according to an embodiment of the present invention.

Referring now to FIGS. 4 and 5, shown are implementations of comparison circuits where it has been assumed that the delay of the primary and secondary data streams are essentially matched in the comparison circuit of the connection integrity monitor.

In FIG. 4 an XOR circuit 56 receives the primary 38 and secondary 40 data streams and passes output to a simple RC filter 58. A threshold detector 60 is used with an input set to a desired threshold level to detect when the output of the RC filter 58 exceeds the threshold voltage and report the detection via the connection integrity status line 24.

In a second exemplary comparison circuit 22B, illustrated in FIG. 4, the XOR circuit 56 provides both subtract (44, FIG. 3) and detect (46, FIG. 3) functions. As is known, if the inputs are equal, the XOR output will be low whereas, if the inputs are not equal, the XOR output will be high. In either case, the XOR output may deviate from predicted levels for brief periods due to subtle signal discrepancies. Thus, if the data streams are the same, the XOR output will be generally low, but if the data streams are different, the likelihood that a single data bit in both streams will be equal is ½ and the output of the XOR circuit 56 will be in the high and low states for about half the time each. In this embodiment, output of the XOR circuit 56 is filtered by the RC filter 58 before a threshold detector 60 is used, with one input set to a desired threshold voltage level, to detect when the filtered difference signal exceeds the threshold voltage. Positive feedback is provided with a resistor from output to positive input to provide hysteresis.

FIG. 5 illustrates a third exemplary comparison circuit 22C. The primary data stream 34 is received at a predetector filter 62 along with the (inverted) secondary data stream 40 using a resistor divider. A peak detector 64, that may be implemented in a variety of ways known to those skilled in the art, receives a signal from the pre-detector filter 62 and passes output to a post-detector filter 66. The threshold detector 60 receives output from the post-detector filter 66 and generates an indication on the connection integrity status line 24.

In the third exemplary comparison circuit 22C of FIG. 5, subtraction (44, FIG. 3) is achieved by combining the primary data stream 34 with the inverted secondary data stream 40 using a resistor divider incorporated in the predetector filter 62. The predetector filter 62 also serves to remove noise in the subtracted signal due to edge misalignments. The output of the peak detector 64 is filtered by the post-detector filter 66 and processed by the threshold detector 60 to result in an indication on the connection integrity status line 24.

Advantageously, the connection integrity monitor 18 provided for monitoring one connection at a time has the same functionality as a connection integrity monitor that monitors all connections at once but reduces the gate usage and power requirement by a value approaching 50% for large switch fabrics (connection circuits). Therefore, the connection integrity monitor 18 reduces redundancy from M to 1.

Other modifications will be apparent to those skilled in the art and, therefore, the invention is defined in the claims.

We claim:

1. A connection integrity monitor for monitoring a connection unit, said connection unit comprising a primary connection map for receiving connection control signals and a primary connection circuit for performing primary connections between a plurality of inputs and a plurality of outputc in order to connect a plurality of input signals at said plurality of inputs to said plurality of outputs as output signals, said primary connections based on said connection control signals, said monitor comprising:

a comparison map for receiving said connection control signals;

an input selection circuit for:
  receiving said plurality of input signals;
  selecting one of said plurality of input signals as a selected input signal;

an output selection circuit for:
  receiving said plurality of output signals;
  selecting one of said plurality of output signals as a selected output signal;
  where at least one of said selecting one of said plurality of input signals and
  said selecting one of said plurality of output signals is based on said connection control signals;

a comparator for:
  receiving said selected input signal;
  receiving said selected output signal; and
  determining a connection integrity status indicator from said selected input signal and said selected output signal.

2. The monitor of claim 1 wherein said comparator includes a difference circuit for generating a signal indicative of a difference between said selected input signal and said selected output sigal.

3. The monitor of claim 2 wherein said difference circuit comprises an Exclusive OR gate.

4. The monitor of claim 2 wherein said comparator includes a threshold detector for determining whether said difference indicative signal exceeds a threshold.

5. The monitor of claim 2 wherein said comparator comprises a filter for filtering said difference indicative signal.

* * * * *